United States Patent [19]
Skeggs et al.

[11] Patent Number: 5,205,237
[45] Date of Patent: Apr. 27, 1993

[54] METHOD AND APPARATUS FOR GROWING FISH IN A RECIRCULATING TANK

[76] Inventors: Leonard T. Skeggs, 10212 Blaie La., Kirtland, Ohio 44094; Mitsuo Teraguchi, deceased, late of Cleveland Hgt.; by Sonja E. Teraguchi, executrix, 2517 Norfolk Rd., Cleveland Hgt., both of Ohio 44106

[21] Appl. No.: 779,022
[22] Filed: Oct. 18, 1991
[51] Int. Cl.⁵ .............................................. A01K 63/04
[52] U.S. Cl. ........................................ 119/3; 119/5; 210/169
[58] Field of Search .............................. 119/2, 3, 4, 5; 261/123, 124; 210/169

[56] References Cited

U.S. PATENT DOCUMENTS

| | | | |
|---|---|---|---|
| 2,302,336 | 11/1942 | Macdonald | 119/5 |
| 3,320,928 | 5/1967 | Smith | 119/5 |
| 3,696,788 | 10/1972 | Day et al. | 119/2 |
| 4,030,450 | 1/1977 | Hoult | 119/3 |
| 4,141,318 | 2/1979 | MacVane et al. | 119/3 |
| 4,182,268 | 1/1980 | Berger | 119/3 |
| 4,471,718 | 9/1984 | Olson | 119/3 |
| 4,807,615 | 2/1989 | Nakagawa et al. | 119/3 |
| 5,036,618 | 8/1991 | Mori | 119/3 |
| 5,081,954 | 1/1992 | Monus | 119/5 |

*Primary Examiner*—John G. Weiss
*Attorney, Agent, or Firm*—Renner, Otto, Boisselle & Sklar

[57] ABSTRACT

Method and apparatus for providing an enhanced environment for supporting aquatic life includes an open container containing a body of water and an oxygen collecting canopy overlying a portion of the body of water and having peripheral edges which extend into the body of water. Oxygen is supplied to the body of water near the bottom of the container directly beneath the canopy so that the oxygen will rise through the body of water and into the canopy to maintain the canopy filled with oxygen. Water is recirculated from the container through the canopy to oxygenate the water and then returned to the container. At least a portion of the recirculating water is directed through one or more filters and zeolite containing tanks or trays prior to passing through the canopy and back into the container. Also, the recirculating water is dripped through open air to remove carbon dioxide from the water and increase the pH of the water.

29 Claims, 5 Drawing Sheets

METHOD AND APPARATUS FOR GROWING FISH IN A RECIRCULATING TANK

BACKGROUND OF THE INVENTION

This invention relates generally to a method and apparatus for growing fish and other aquatic life in a recirculating tank.

Aerators and bubbling systems for oxygenating water for the support of fish and other aquatic life are known in the art. Commercially available aerators generally consist of a motor and impeller that are immersed in and agitate the surface of the water, whereas bubbling systems generally involve pumping air to the bottom of a body of water and expelling it into the body of water so it bubbles up through and aerates the water. It is also known, for example, from U.S. Pat. No. 3,320,928 to provide a system to trap air as it bubbles to the surface of a body of water and then recirculate the air to the bottom of the body of water.

It is further known to aerate a body of water by providing mixing chambers into which air and water are allowed to combine under pressure to thereby obtain an increased absorption of air into the water. The water is then introduced to the main body of water at a plurality of locations adjacent the bottom of the body of water which is to be aerated.

Moreover, it is known, for example, from U.S. Pat. No. 2,302,336 to provide a hermetically closed container for water having an air space above the water which has been oxygenated and placed under pressure to thereby provide a healthier atmosphere for aquatic life in the water.

There is a need, however, for an apparatus and method for the production and growth of aquatic life, such as fish raised commercially for food purposes, in which a highly oxygenated aquatic environment is provided and in which oxygen supplied to the system is not wasted.

There is also a need for a system for growing fish under ideal conditions to maximize growth rate by maximizing the infusion of oxygen into water that is being recirculated in a recirculating tank and removing certain impurities such as carbon dioxide and ammonia from the water that are harmful to the fish.

SUMMARY OF THE INVENTION

The present invention provides a recirculating system for a fish growing tank and system in which the recirculated water is aerated within an enclosed canopy overlying the body of water in which fish are being raised.

In accordance with one aspect of this invention, recirculating water which is being returned to the main body of water is allowed to drip through an oxygen containing canopy, thereby absorbing oxygen before its return to the main body.

In accordance with another aspect of this invention, an adequate supply of oxygen is maintained within the canopy to oxygenate the recirculating water by using the canopy to trap oxygen which is periodically bubbled through the body of water contained within the tank from a point directly beneath the canopy.

In accordance with yet another aspect of this invention, a pumping and filtering system is provided in which a portion of the water is pumped from the tank for recirculation through a diatomaceous earth filter, bag filter and/or carbon filters and then into the canopy where the water is oxygenated before being reintroduced into the tank.

Still further in accordance with this invention, a method and apparatus are provided for removing carbon dioxide from the recirculating water and increasing the pH of the recirculating water by dripping it through open air and then into the aforementioned canopy and back into the main body of water.

In accordance with still another aspect of the invention, the recirculating water is passed through shallow open trays containing zeolite for removing ammonia from the recirculating water.

In accordance with still another aspect of the invention, the water is slowly rotated in a tank by a paddle wheel which causes large dirt particles in the water to accumulate at the center of the bottom of the tank without breaking up for ease of removal therefrom by periodically opening a drain valve connected to the center of the bottom of the tank.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENTS

Figure 1:
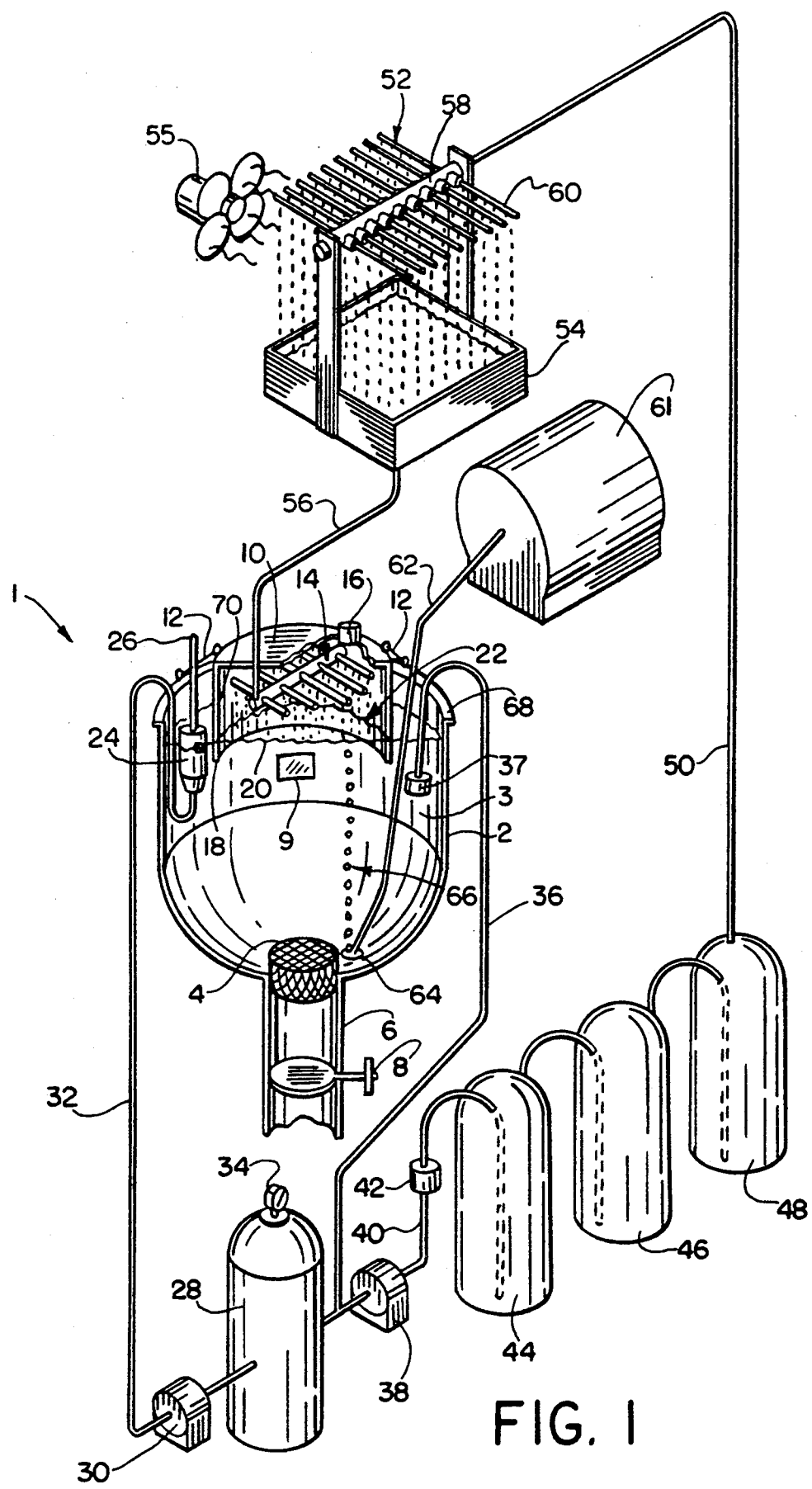
FIG. 1 is a schematic illustration, partially in section, of one form of fish growing tank and associated systems in accordance with this invention.

Referring now in detail to the drawings, and initially to FIG. 1, the fish growing system/apparatus 1 schematically illustrated therein consists of a growing tank 2 for containing a body of water 3 in which fish and other aquatic life are to be cultured. The tank is provided with a screen or filter 4 which overlies a bottom tank drain 6. The screen 4 serves to prevent loss of fish through the drain when the drain valve 8 is periodically opened to remove large dirt particles which accumulate at the center of the bottom of the tank. The tank may also include an observation window 9.

Figure 3:
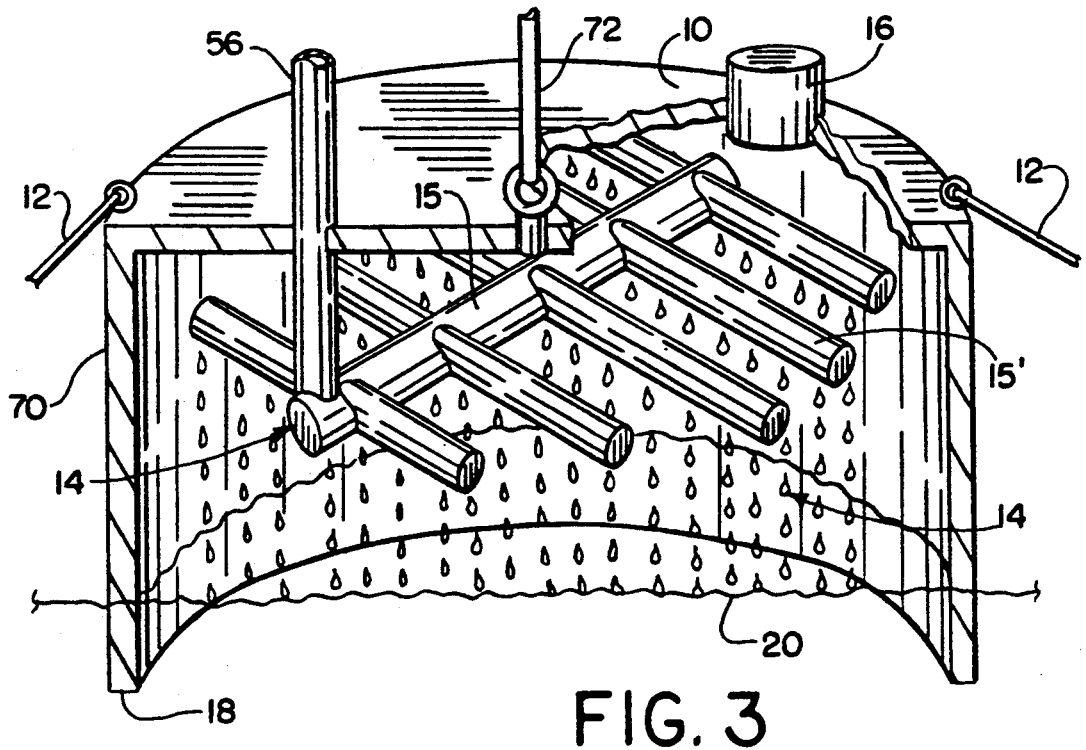
FIG. 3 is an enlarged fragmentary perspective view of the canopy portion of the system of FIG. 1.

Overlying a large portion of the body of water contained within the tank 2 is a canopy or enclosure 10 which may be constructed of a suitable plastic material such as ⅜" thick Lexan over a red oak frame. The canopy 10 is airtight and when filled with oxygen floats on the surface of the water while being held in place by guides 12 (FIG. 3). Placed within the canopy 10 adjacent the top thereof is a manifold 14 which is comprised of a series of pipes 15, 15' having a large number of holes through which water may drip through the oxygen in the canopy and back into the main body of water as described hereafter. At the top of the canopy is a vent 16 which is provided with a valve (not shown) that may be opened and closed to let air out of the canopy and to contain oxygen within the canopy.

On initial start up of the system 1, the vent 16 is opened, allowing the canopy 10 to sink into the body of water 3, which drives any air out of the canopy that may have been trapped inside. The vent 16 is subsequently closed, and the inside of the canopy 10 is then filled with pure oxygen using either an oxygen generator or an oxygen bottle and tubing (not shown). Using an oxygen bottle has the advantage that the canopy can be filled with oxygen much more rapidly than if an oxygen generator is used. The oxygen displaces the water in the canopy and causes the canopy to rise above the water until restrained by guides 12. Thus, an essentially pure oxygen environment is established in the canopy 10 above the body of water 3.

When the system 1 is operational, as illustrated, the peripheral edges 18 of the canopy 10 lie slightly below the surface 20 of the water in the tank 2 (FIGS. 1 and 3). In other embodiments, it may be desirable merely to allow the edges of the canopy 10 to float on the surface of the water. What is important is to maintain the canopy 10 filled with oxygen so that water returning through the recirculating system in the form of water droplets 22 passing through the canopy will be oxygenated.

In order to recirculate water in the system, it is first necessary to withdraw water from the main body in the tank 2. To this end, a skimmer 24 is provided for skimming water from the tank 2. The skimmer 24 may have a pipe 26 extending therefrom through which diatomaceous earth may be added to coat a diatomaceous earth filter 28 during passage of the water therethrough.

When the system is operating, a pump 30 draws water from the tank through skimmer 24 and flow line 32 and initially into the diatomaceous earth filter 28. Mounted on the filter 28 is a pressure valve 34 which serves as an indicator as to when the filtering medium should be regenerated. Generally, the filter 28 is operated at between two and ten pounds per square inch (2–10 lb./in$^2$) pressure. The filtering medium should be regenerated with diatomaceous earth whenever the pressure rises to a predetermined level, for example, about ten pounds per square inch.

In the system shown in FIG. 1, after the water that has been withdrawn from the tank 2 is pumped through the diatomaceous earth filter 28, it may take either one of two paths back into the tank. The first path leads directly back to the tank through return line 36 and out through check valve 37. Approximately sixty percent (60%) of the water passing through the diatomaceous earth filter 28 may be caused to flow directly back into the main body of water along this first path 36 to reduce resistance to flow and thereby reduce power requirements. If the tank 2 has a capacity for example of between 1000 and 1500 gallons of water, the pump 30 desirably pumps approximately twenty-five gallons of water per hour through the diatomaceous earth filter 20; thus, approximately fifteen gallons of water per hour desirably flow directly back into the tank 2 along the first path 36. Of course, if one were to use a larger tank, it would be necessary to adjust the system to maintain the desired flow characteristics of this particular embodiment. However, it will be apparent that the first flow path through return line 36 could be eliminated altogether if desired.

Figure 2:
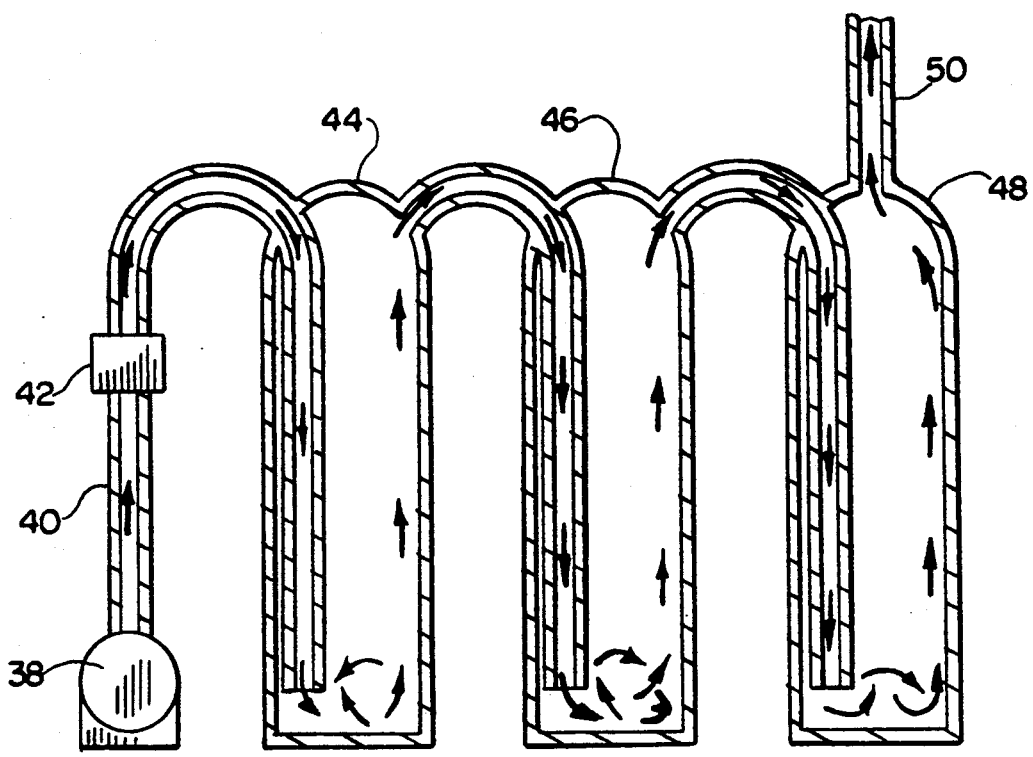
FIG. 2 is an enlarged schematic cross-sectional view through a portion of the water filtering system of FIG. 1.

The water which is not pumped directly back into the tank 2 from the diatomaceous earth filter 28 is diverted by a second pump 38 (see also FIG. 2) through another return line 40. A flow meter 42 serves as a means by which the flow through conduit or return line 40 may be monitored. Water circulating through return line 40 is directed into one or more zeolite containing tanks 44 and 46. Two 10"×54" fiberglass tanks 44 and 46 are shown, each filled with 1½ cubic feet of zeolite. The purpose of the zeolite tanks is to remove ammonia from the water, and such tanks need periodic regeneration with sodium chloride brine.

From the zeolite tanks 44 and 46, the returning water may then be passed through another fiberglass tank 48 which is filled with 1½ cubic feet of carbon to remove complex organic compounds from the water. Tank 48 must be emptied periodically and refilled with fresh carbon. All three tanks 44, 46 and 48 may be substantially the same size.

Figure 4:
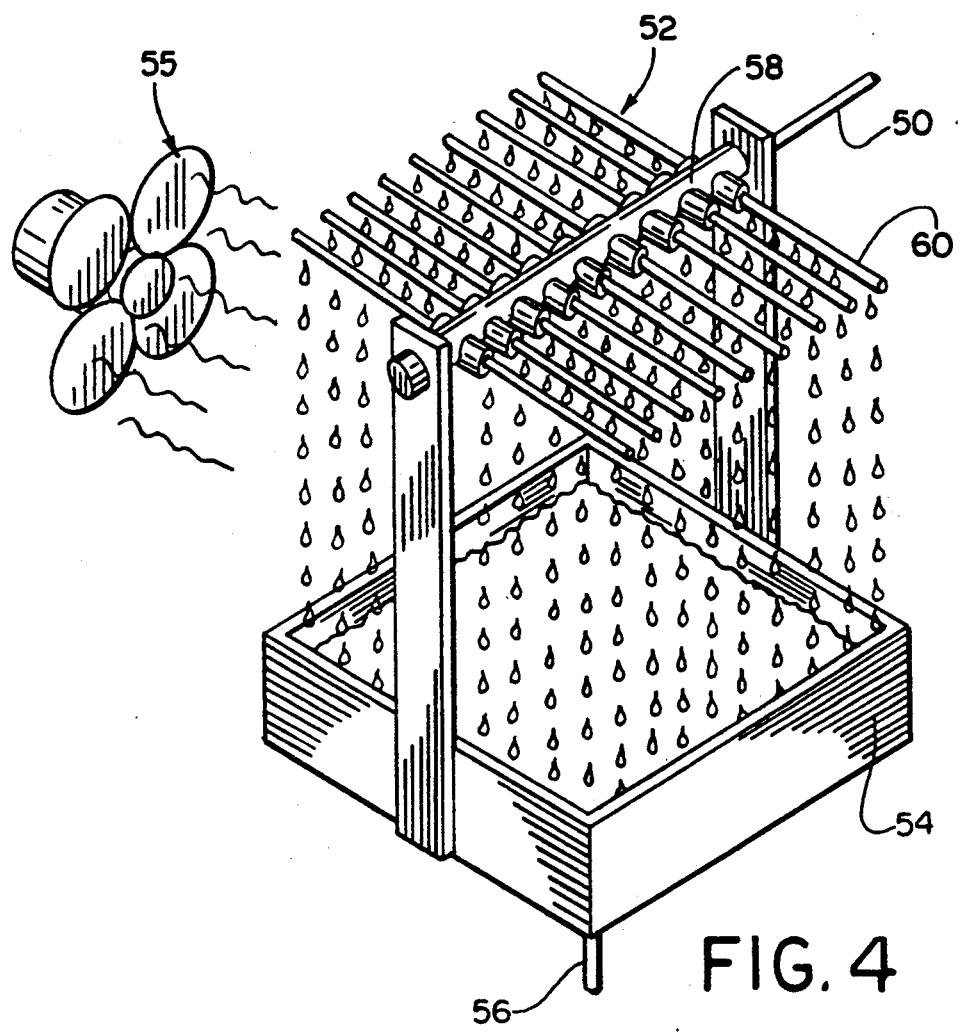
FIG. 4 is an enlarged perspective view of the pH control system of FIG. 1.

Recirculating water flows from tank 48 through return line 50 and into a manifold 52 (see FIGS. 1 and 4). Manifold 52 with its associated tray 54 and fan 55 are designed to aid in the removal of carbon dioxide from the recirculating water, thereby increasing the pH of the recirculating water. If a fish culturing system such as that described is used, for example, to grow perch, the accumulation of carbon dioxide and drop in pH appears to be especially toxic when the perch are young. Therefore, it is essential when growing perch that the carbon dioxide be removed and the pH be prevented from falling too far, for example below about seven or less. Adding sodium bicarbonate will also help keep the pH higher, and such addition may aid in buffering carbonic acid in the system. However, chemical additions may be undesirable from a health standpoint; therefore, it is desirable to control pH substantially through use of the free air approach disclosed herein.

Manifold 52 contains a large number of small holes through which the stream of water passing through the filter tank 28 and zeolite and carbon tanks 44, 46 and 48 returns to the main water tank 2. The water is dripped from the manifold 52 through the open air and into a tray 54, thereby effecting a release of carbon dioxide which increases the pH. Fan 55 increases air flow through the falling droplets, enhancing the release of carbon dioxide. Water collected in tray 54 is then directed by return line 56 to manifold 14 (FIGS. 1 and 3) contained within the upper portion of canopy 10. From there, the water drips through the oxygen filled canopy 10 and into the main tank 2.

The pH control system, i.e., manifold 52, tray 54 and fan 55, is mounted above the canopy 10 and main tank 2 as schematically shown in FIG. 1. The manifold 52 utilized in the fish growing system depicted in FIG. 1 was constructed of a two inch plastic main backbone 58 having a number of one-half inch plastic arms 60 extending therefrom, each containing approximately 2,200 1/16" diameter holes.

To maintain an adequate supply of oxygen in the canopy 10, an oxygen generator 61 is utilized. The generator 61 used in the system shown in FIG. 1 can supply oxygen at the rate of between approximately 3.8 and 4.2 liters per minute. Oxygen from generator 61 is supplied through tubing 62 and is discharged generally at the bottom of the tank 2 through an oxygen diffuser 64 located directly beneath the canopy 10.

The oxygen supply from generator 61 may be intermittent, and the generator may be turned on and off with an automatic timer. The minimum amount of time the generator 61 should be kept on will depend on such factors as the size of the generator and number and size of the fish in the tank.

Oxygen supplied by the generator 61 bubbles up through the water in the tank 2, as indicated in area 66, eventually rising to the water surface enclosed by the canopy 10, thereby keeping the canopy filled with oxygen and buoyed above the surface of the water. At the same time, the oxygen rising through the water within the tank 2 further serves to oxygenate it.

Ideally, at least seven milligrams of oxygen per liter of water should be provided in order to supply adequate oxygen for fish contained within the tank. The system described herein can provide approximately twenty-five milligrams of oxygen per liter of water when the generator 61 is operated approximately twenty-five percent of the time as long as the fish load is not too heavy.

The canopy 10 provides a reserve of oxygen so that when the oxygen generator 61 is turned off, water continues to be oxygenated as it drips through the canopy atmosphere. The canopy 10 covers a major part of the water surface, but is preferably set back somewhat from the sides 68 of the tank 2 as schematically illustrated in FIG. 1 so that access may be had to the water surface between the canopy's peripheral sides 70 and the side wall 68 of the tank for fish feeding and also for access to the bottom of the tank for cleaning.

With further reference to FIG. 3, in which the canopy 10 is shown, note that a line 72 may be used to assist in raising and lowering the canopy. This line may be supported by a pulley or block and tackle. Since the canopy is heavier than the water, it would sink but for the oxygen pressure trapped inside. However, the line 72 is useful, if tensioned, to insure that the canopy 10, when the system is in use, remains adequately above, but in peripheral lower edge contact with the surface of the water.

Figure 5:
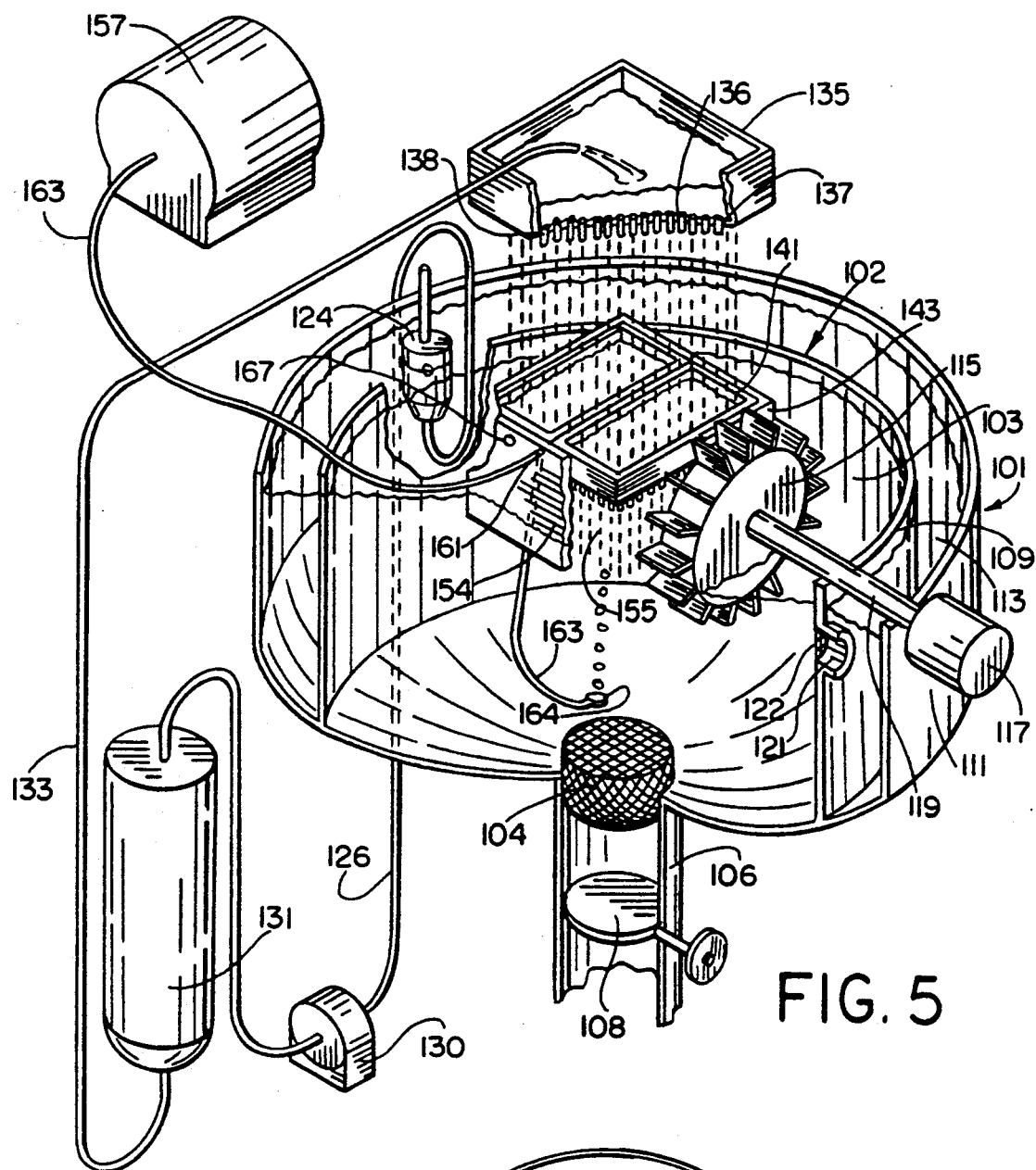
FIG. 5 is a schematic illustration, partially in section, of a modified form of fish growing tank and associated systems in accordance with this invention.
Figure 6:
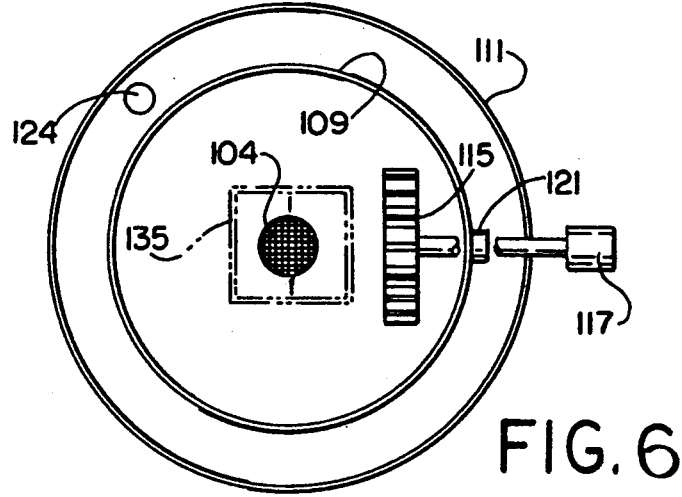
FIG. 6 is a top plan view schematically illustrating the tank of FIG. 5.

With reference now to FIG. 5, there is illustrated a modified fish growing system 101 in accordance with this invention including a tank 102 for containing a body of water 103 which is used to raise fish or other aquatic life. The tank 102 is provided with a screen or filter 104 which overlies a tank drain 106. Valve 108 is provided to selectively remove water from the growing tank through drain 106.

In this modification, the fish growing body of water 103 is contained within an inner tank 109 which, in turn, is contained within an outer tank 111. This provides for a waste settling channel 113 which surrounds the inner fish growing tank 109.

The water in the inner tank 109 may be caused to rotate circularly very slowly around the tank by paddle wheel 115 which is operated by a suitable variable speed direct current motor 117 which drives paddle wheel shaft 119. Rotating the water in the tank very slowly causes the larger dirt particles (which are the major portion of the dirt) to accumulate at the center of the bottom of the tank where they can be removed by periodically opening the main drain valve 108. Much of the finer dirt will exit the inner tank 109 into the settling channel 113 through an opening 121 in the side of the inner tank 109 located below the normal water level in the tank. Desirably, a screen 122 is provided over the opening 121 so that fish will not escape from the inner to the outer tank 111.

It is also possible to channel water from the inner main tank 109 out a suitable exit port, such as 121, and into a completely separate settling tank (not shown), which would replace the outer tank 111 and settling channel 113 located about the periphery of the main tank.

In operation, water is recirculated in the system 101 by a pump 130 which withdraws the water through skimmer 124 into pipe 126 and directs the water through a cloth bag or diatomaceous filter 131. The water is then channeled upwardly through pipe 133 and into an upper water reservoir tray 135. The upper reservoir tray 135 is bottom drilled so that it contains a large number of apertures 136 through which the water may flow.

Preferably, the bottom 137 of the tray 135 is made of a suitable plastic, and the apertures 136 that have been drilled in the bottom are fitted with short pieces of downwardly extending plastic tubing 138.

It will be appreciated that the flow rate through the tubing 138 will vary as a function of the depth of water in the upper tray 135. In experimental tests, each square foot of tray bottom 137 was drilled with thirty-six, $\frac{1}{8}''$ equidistantly spaced holes each having a two inch spacing therebetween. The tubing 138 used was $\frac{1}{8}''$ OD and 1/16" ID by $\frac{3}{4}''$ long, and the tray bottom 137 was approximately $\frac{1}{4}''$ thick, leaving a tube projection from the bottom of approximately $\frac{1}{2}''$. It has been found that there is a slightly slower flow from the top tray 135 when the tubes 138 extend below the tray bottom approximately $\frac{1}{2}''$ than if they extend a lesser distance, for instance $\frac{1}{4}''$ below the bottom. Also, it has been found that if the height of the water in the tray 135 is low, the water falls in discrete drops, whereas if the water is fairly deep in the tray, it will fall in a steady stream. In either case, as the water falls through the atmosphere, a $CO_2O_2$ exchange is effected.

Figure 7:
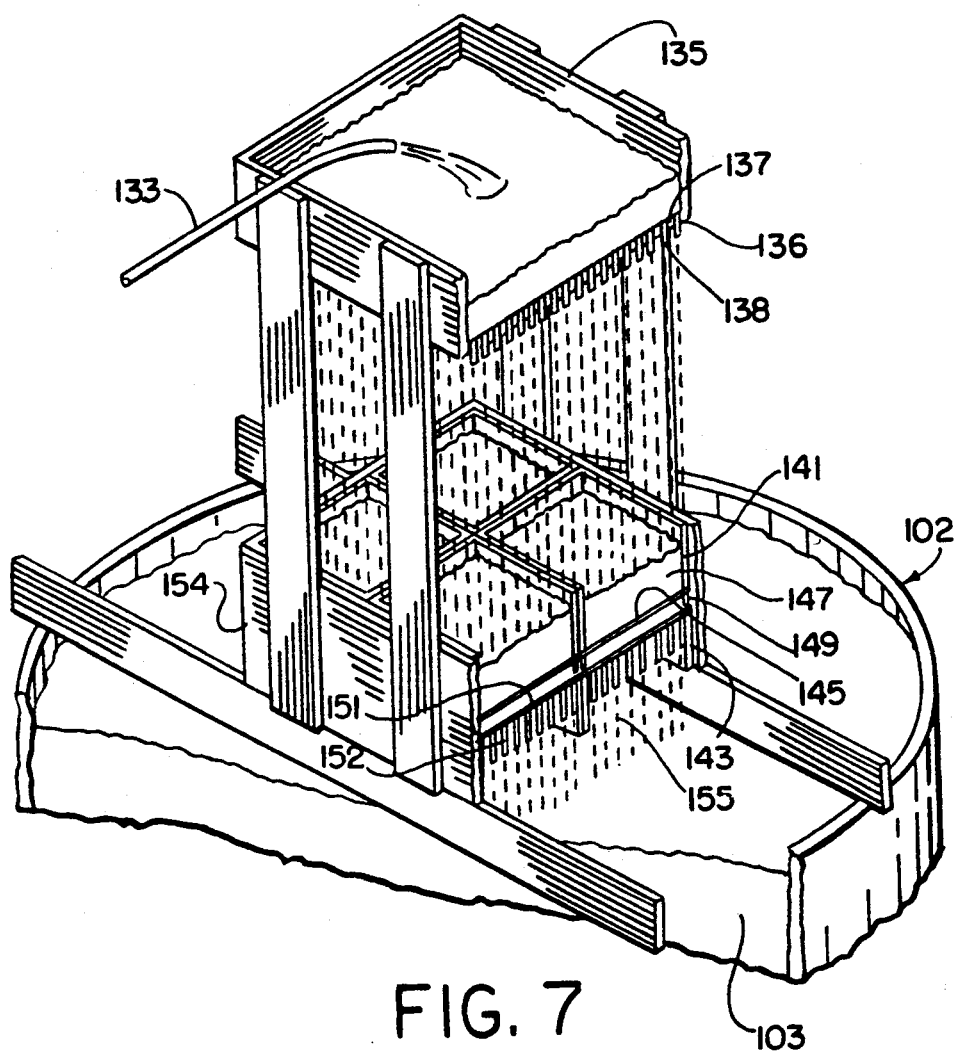
FIG. 7 is an enlarged perspective view of part of a filtering system usable in a modified embodiment similar to that illustrated in FIG. 5.

The water from the top tray 135 falls onto shallow open trays 141 therebeneath which may contain zeolite (Clino) to remove ammonia from the water. The zeolite containing trays 141 are nested in a lower tray 143, and have stainless steel screened bottoms 145 which support the zeolite 147 (see FIG. 7). stainless steel screened bottoms 145 which support the zeolite 147 (see FIG. 7).

Trays 141 are provided with feet 149 which support the trays above the bottom 151 of lower support tray 143. This distancing of the bottom of the zeolite trays 143 from the bottom of the support tray 145 permits water to flow under the zeolite trays and disperse over the bottom of support tray 143.

Similar to the upper tray 135, the support tray 143 is fitted with a large number of tubed apertures 152 in the tray bottom 151 through which the water proceeding through the system's cascade may flow. Extending downwardly from all four sides of the support tray 143 are sealed side walls 154 (the right side wall 154 being omitted from FIG. 7 for reasons of clarity) which define an enclosed oxygen chamber or canopy 155 thereunderneath. Water dripping through tubes 152 passes through the oxygenated chamber 155 and then drops into the main tank water 103.

Oxygen may be supplied by an oxygen generator 157 to the enclosed chamber 155 through tuning 163 which extends into the chamber through an entrance port 161 and then to an oxygen diffuser 164 located generally at the bottom of the main inner tank 109 directly beneath the chamber for release under the chamber. Additionally, a closable exit port 167 may be provided in one of the chamber side walls 154 to failitate testing for oxygen, nitrogen, and carbon dioxide content of the interior of the chamber 155.

The advantage of the system shown in FIG. 5 over that shown in FIG. 1 is that the trays and associated tubing are easier to clean than the manifold 52 and zeolite tanks of the previous embodiment. Cleaning is accomplished when the system is shut down by blowing compressed air through the openings in both the top tray 135 and, after removal of the zeolite trays 141, through the bottom openings in the lower tray 143. The trays 135 and 143 are also easier to inspect for fungal buildup, and the zeolite tray portion 141 of the system may be readily disassembled.

In maintaining the system, it is desirable to periodically regenerate the zeolite in a large cylindrical chromatographic column. The zeolite is normally regenerated with salt (sodium chloride) brine and then rinsed with water. Although not shown, the regenerating column can be a large plexiglass tube capped at both its top and bottom ends. The top and bottom end caps are preferably fitted with tubes for pumping sodium chloride containing solution into the cylindrical chamber and then allowing it to flow out of the chamber.

The column may be fitted with gimbals to facilitate removal of the zeolite after regeneration by tipping the column almost 180° as desired. Appropriate filter plates may also be provided at either end of the column to hold the zeolite within the cylinder as it is being regenerated.

The above-described systems for growing fish are desirably set up in an insulated building equipped with a heating system and a cooling system, since it is far easier to control the factors necessary to promote a rapid rate of fish growth in an indoor system than in an outdoor system. The factors that need to be controlled include oxygen, carbon dioxide and pH, effective water filtration and ammonia removal, and food type and amount.

It has been found desirable to maintain the temperature of the building containing the systems of the present invention at approximately seventy degrees (70° F.) if, for instance, perch are being cultured. It has also been found desirable to pump fresh water from a spring or the like into one or more holding tanks in the building to provide a reserve water supply. Because spring water is initially normally quite cold, it should be held in the reserve tanks until it warms to the ambient temperature of the building before it is used to replace water in the fish growing tank. In a system having the volumes described in this application, not more than ten percent of the water in the growing tank need be replaced each day.

The systems described herein generate enough oxygen to maintain as many as 10,000 perch per 1,000 gallons of water. As a practical matter, however, a fish population in the systems of the capacities described should fall within a range of 4,000 to 5,000 fish per 1,000 gallons of water.

Although this invention has been shown and described with respect to certain preferred embodiments, it is obvious that equivalent alterations and modifications will occur to others skilled in the art upon a reading and understanding of the specification. The present invention includes all such equivalent alterations and modifications and is limited only by the scope of the claims.

What is claimed is:

1. A method of providing an enhanced environment for fish in an open container of water comprising the steps of positioning an oxygenated canopy to overlie a portion of the body of water in the container, and recirculating at least a portion of the water in the container through the oxygenated canopy to oxygenate the water and then back into the container, the step of recirculating including passing the recirculating water through vertically spaced trays having apertured bottoms containing downwardly extending tubes for passage of the water therethrough.

2. The method of claim 1 wherein at least one of the trays contains a medium for removing ammonia from the recirculating water passing therethrough.

3. Apparatus for providing an enhanced environment for supporting aquatic life comprising an open container containing a body of water, canopy means overlying a portion of the body of water in said container, means for maintaining a supply of oxygen in said canopy means, water recirculating means for recirculating water from said container through the oxygen within said canopy means to oxygenate the water and then back into said container, open tray means containing zeolite through which the recirculating water passes for removing ammonia from the recirculating water prior to being recirculated through said canopy means, and second open tray means containing a plurality of said open tray means of zeolite, said second tray means having an apertured bottom through which the recirculating water passes into said canopy means to oxygenate the water as the water falls back into said container.

4. The apparatus of claim 3 wherein said canopy means is formed by side walls extending downwardly from said second tray means into contact with the body of water in said container.

5. Apparatus for providing an enhanced environment for supporting aquatic life comprising an open container containing a body of water, canopy means overlying a portion of the body of water in said container, means for maintaining a supply of oxygen in said canopy means, water recirculating means for recirculating water from said container through the oxygen within said canopy means to oxygenate the water and then back into said container, means for removing carbon dioxide from at least a portion of the recirculating water including manifold means having a plurality of holes through which the recirculating water passes, first open tray means located directly below said manifold means in spaced relation therefrom for catching the recirculating water passing through said manifold means after the recirculating water falls through open air to release the carbon dioxide from the recirculating water, and means for directing the recirculating water collected in said first open tray means to said canopy means.

6. The apparatus of claim 5 further comprising fan means for increasing air flow through the recirculating water while passing from said manifold means to said first open tray means to enhance the release of carbon dioxide from the recirculating water.

7. The apparatus of claim 5 further comprising means for removing ammonia from at least a portion of the recirculating water, said means for removing ammonia comprising second open tray means containing zeolite through which the recirculating water passes prior to passing through said canopy means.

8. The apparatus of claim 7 wherein said second open tray means is located directly beneath said first open tray means, said first open tray means having an apertured bottom through which the recirculating water passes from said open tray means to said second open tray means.

9. The apparatus of claim 8 further comprising third open tray means containing a plurality of said second open tray means, said third open tray means having an apertured bottom for discharge of the recirculating water into said canopy means to oxygenate the water as the water falls through said canopy means and back into said container.

10. The apparatus of claim 9 wherein said canopy means is formed by side walls extending downwardly from said third open tray means into contact with the body of water in said container.

11. The apparatus of claim 5 further comprising paddle wheel means extending downwardly into said open container, variable speed direct current drive means for controlling the speed of rotation of said paddle wheel means to cause the water to slowly rotate around the interior of said open container to cause large dirt particles in the water to accumulate at the center of the bottom of said open container, and valve means connected to the center of the bottom of said open container to remove the large dirt particles therefrom upon opening said valve means.

12. The apparatus of claim 5 further comprising an outer container surrounding said open container defining a settling chamber therebetween, and opening means in a side wall of said open container below the normal level of water in said open container through which fine dirt particles in the water flow from said open container to said settling chamber.

13. A method of providing an enhanced environment for fish in an open container of water comprising the steps of positioning an oxygenated canopy to overlie a portion of the body of water in the container, and recirculating at least a portion of the water in the container through the oxygenated canopy to oxygenate the water and then back into the container, the step of recirculating including passing the recirculating water through vertically spaced trays having apertured bottoms for passage of the water therethrough.

14. The method of claim 13 wherein dissolved carbon dioxide is removed from the recirculating water during passage of the recirculating water between two of said trays.

15. The method of claim 14 wherein the removal of dissolved carbon dioxide from the recirculating water takes place during passage of the recirculating water through open air between said two trays.

16. The method of claim 13 further comprising the steps of slowly rotating the water around the interior of the container using paddle wheel means to cause large dirt particles in the water to accumulate at the center of the bottom of the container, and periodically opening a drain valve connected to the center of the bottom of the container to remove the large dirt particles therefrom.

17. The method of claim 13 wherein the canopy is supported by a supply of air/oxygen in the canopy, further comprising the step of venting the canopy to allow the canopy to sink into the body of water and thereby displace air from the canopy prior to filling the canopy with oxygen which causes the canopy to rise relative to the body of water.

18. A method of providing an enhanced environment for supporting fish and the like comprising the steps of providing an open tank containing a body of water, placing a canopy in overlying relation to a portion of the body of water within the tank, venting the canopy to allow the canopy to sink into the body of water and thereby displace air from the canopy, filling the canopy with oxygen which causes the canopy to rise relative to the body of water, and recirculating a portion of the water within the tank through the canopy to oxygenate the water prior to reintroducing the water back into the tank.

19. A method of providing an enhanced environment for supporting fish and the like comprising the steps of providing an open tank containing a body of water, placing a canopy in overlying relation to a portion of the body of water within the tank, filling the canopy with oxygen, recirculating a portion of the water within the tank through the canopy to oxygenate the water prior to reintroducing the water back into the tank, slowly rotating the water around the interior of the tank using paddle wheel means to cause large dirt particles in the water to accumulate at the center of the bottom of the tank, and periodically opening a drain valve connected to the center of the bottom of the tank to remove the large dirt particles therefrom.

20. Apparatus for providing an enhanced environment for supporting aquatic life comprising an open container containing a body of water, canopy means overlying a portion of the body of water in said container, means for maintaining a supply of oxygen in said canopy means, open tray means containing a filtration medium, and water recirculating means for recirculating water from said container into said open tray means, said open tray means having an apertured bottom through which the recirculating water passes into said canopy means to oxygenate the recirculating water as the recirculating water falls back into said container, said canopy means being formed by side walls extending downwardly from said open tray means into contact with the body of water in said container.

21. The apparatus of claim 20 wherein said filtration medium is zeolite.

22. The apparatus of claim 20 wherein said open tray means contains a plurality of smaller open tray means containing said filtration medium.

23. The apparatus of claim 20 wherein said means for maintaining introduces an oxygen supply within the body of water such that oxygen rises through the body of water and into said canopy means to replenish the supply of oxygen in said canopy means.

24. The apparatus of claim 20 further comprising paddle wheel means extending downwardly into said open container, variable speed direct current drive means for controlling the speed of rotation of said paddle wheel means to cause the water to slowly rotate around the interior of said open container to cause large dirt particles in the water to accumulate at the center of the bottom of said open container, and valve means connected to the center of the bottom of said open container to remove the large dirt particles therefrom upon opening said valve means.

25. The apparatus of claim 20 further comprising an outer container surrounding said open container defining a settling chamber therebetween, and opening means in a side wall of said open container below the normal level of water in said open container through which fine dirt particles in the water flow from said open container to said settling chamber.

26. Apparatus for providing an enhanced environment for supporting aquatic life comprising an open container containing a body of water, canopy means overlying a portion of the body of water in said container, means for supplying oxygen to said canopy means, and water recirculating means for recirculating water from said container through the oxygen within said canopy means to oxygenate the water and then back into said container, said canopy means having peripheral edges in contact with the surface of the body of water in said container, said canopy means being supported in the water by a supply of air/oxygen within said canopy means, said canopy means including vent means which when opened, allows said canopy means to sink in the body of water in said container to displace air therefrom, and when subsequently closed, allows said canopy means to be filled with oxygen which displaces the water from said canopy means, causing said canopy means to rise in the water.

27. The apparatus of claim 26 wherein said water recirculating means comprises a pump and conduit system including manifold means having a plurality of aperture means through which at least a portion of the recirculating water passes into said canopy means to oxygenate the recirculating water as the recirculating water falls back into said container, said manifold means being located within said canopy means above the surface of the body of water in said container.

28. The apparatus of claim 27 wherein said manifold means comprises drip tray means having an apertured bottom through which the recirculating water passes into said canopy means to oxygenate the recirculating water as the recirculating water falls back into said container.

29. The apparatus of claim 28 wherein said drip tray means includes at least one tray containing zeolite for removing ammonia from the recirculating water.

* * * * *